United States Patent [19]
Fleming

[11] Patent Number: 5,279,488
[45] Date of Patent: Jan. 18, 1994

[54] ADJUSTABLE WORKSTATION FOR VEHICLES

[76] Inventor: James Fleming, 140 Sherry La., Kalispell, Mont. 59901

[21] Appl. No.: 911,818

[22] Filed: Jul. 9, 1992

[51] Int. Cl.$^5$ .............................................. E04G 3/00
[52] U.S. Cl. ..................................... 248/279; 108/43; 248/283; 248/288.3; 248/447; 248/452
[58] Field of Search ............... 248/279, 278, 276, 282, 248/283, 284, 285, 288.3, 288.5, 289.1, 291, 295.1, 296, 447, 452; 108/49, 43

[56] References Cited

U.S. PATENT DOCUMENTS

| | | |
|---|---|---|
| 2,461,256 | 2/1949 | Black . |
| 2,657,107 | 10/1953 | Bisaga et al. ............ 311/21 |
| 2,862,328 | 12/1958 | Wadsworth ............ 45/83 |
| 2,934,391 | 4/1960 | Bohnett ............ 312/293 |
| 3,059,948 | 10/1962 | Thompson et al. ........... 248/288.5 X |
| 3,207,567 | 9/1965 | Brady ............ 312/235 |
| 3,366,430 | 1/1968 | Diedrich ............ 248/285 X |
| 3,391,659 | 7/1968 | Cross ............ 108/45 |
| 3,592,144 | 7/1971 | Futrell ............ 108/44 |
| 3,784,142 | 1/1974 | O'Brien ............ 248/311 |
| 3,922,973 | 12/1975 | Sturgeon ............ 108/26 |
| 3,994,465 | 11/1976 | Rudnitzky ............ 248/311.1 |
| 4,053,133 | 10/1977 | Kauffman ............ 248/452 |
| 4,174,669 | 11/1979 | Lalonde ............ 108/44 |
| 4,312,507 | 1/1982 | Smith et al. ............ 273/237 |
| 4,341,418 | 7/1982 | Chappell ............ 297/192 |
| 4,359,004 | 11/1982 | Chappell ............ 108/44 |
| 4,481,846 | 11/1984 | Goodell ............ 83/438 |
| 4,558,618 | 12/1985 | Bachmann et al. ............ 83/438 |
| 4,568,052 | 2/1986 | Solomon et al. ............ 248/447 X |
| 4,586,440 | 5/1986 | Avella ............ 108/23 |
| 4,611,734 | 9/1986 | Luecking et al. ............ 224/42.42 |
| 4,672,898 | 6/1987 | Davidson ............ 108/6 |
| 4,741,504 | 5/1988 | Monroe ............ 248/286 |
| 4,751,620 | 6/1988 | Wright et al. ............ 362/99 |
| 4,787,614 | 11/1988 | Givens ............ 269/303 |
| 5,100,091 | 3/1992 | Pollak ............ 248/278 |

FOREIGN PATENT DOCUMENTS

34f/81290  1/1966  Fed. Rep. of Germany .

Primary Examiner—Ramon O. Ramirez
Attorney, Agent, or Firm—Wells, St. John, Roberts, Gregory & Matkin

[57] ABSTRACT

An adjustable workstation for vehicles includes a mounting bracket, an upstanding support arm extending upward from the support bracket, and a planar working surface coupled to the support arm. The workstation includes a hinge means interconnecting the mounting bracket and the support arm, an extension means within the support arm for adjusting the height of the support arm, and a pivot means interconnecting the support arm and the working surface for positioning the working surface in a desired orientation. The hinge means, extension means, and pivot means form a combined adjustment means which allows the workstation to be readily adjusted so that the working surface is positioned in a desired location and orientation. The mounting bracket and the combined adjustment means also allow the workstation to be installed into and removed from a vehicle, and allows the workstation to be collapsed into a compact, transportable configuration.

17 Claims, 6 Drawing Sheets

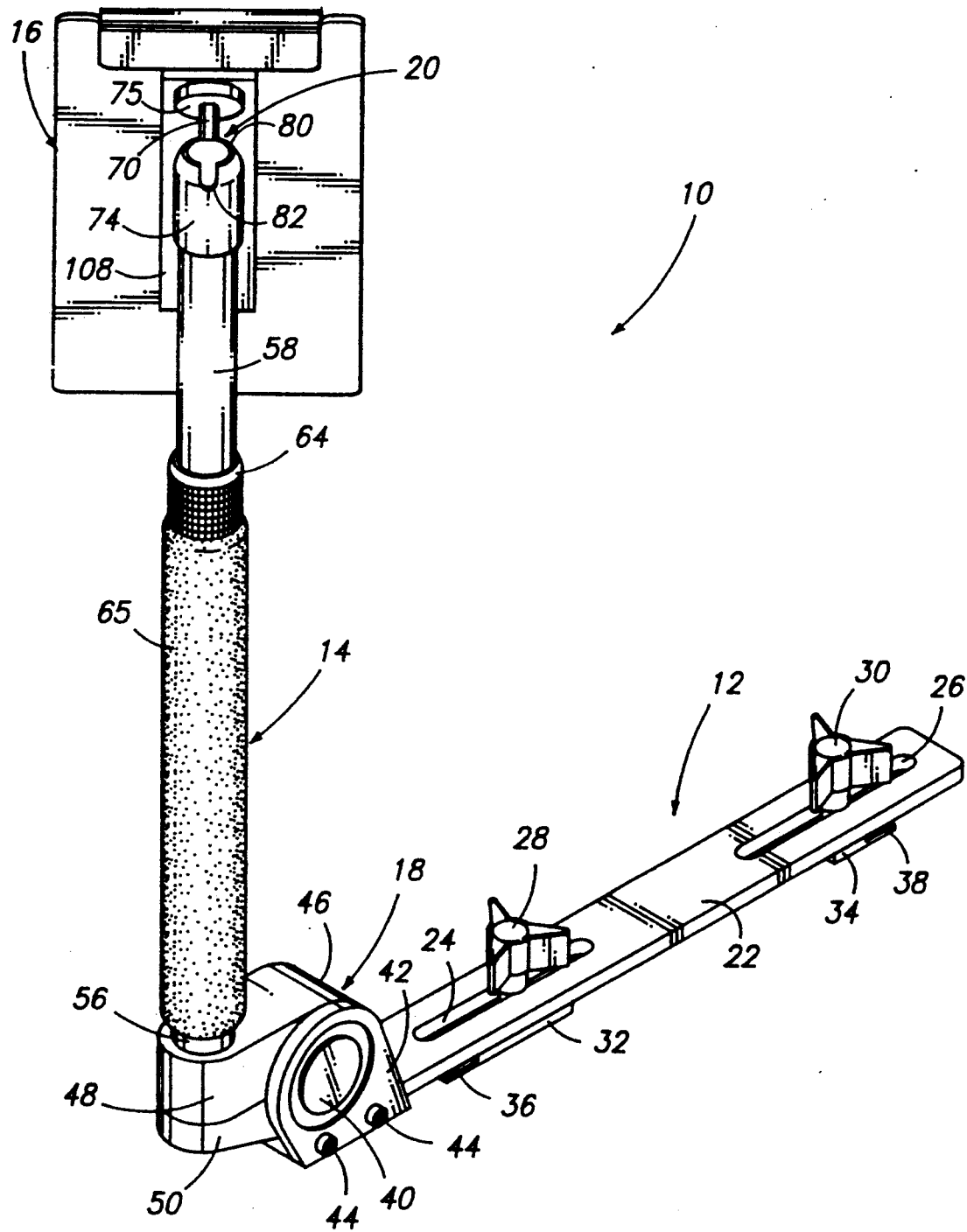

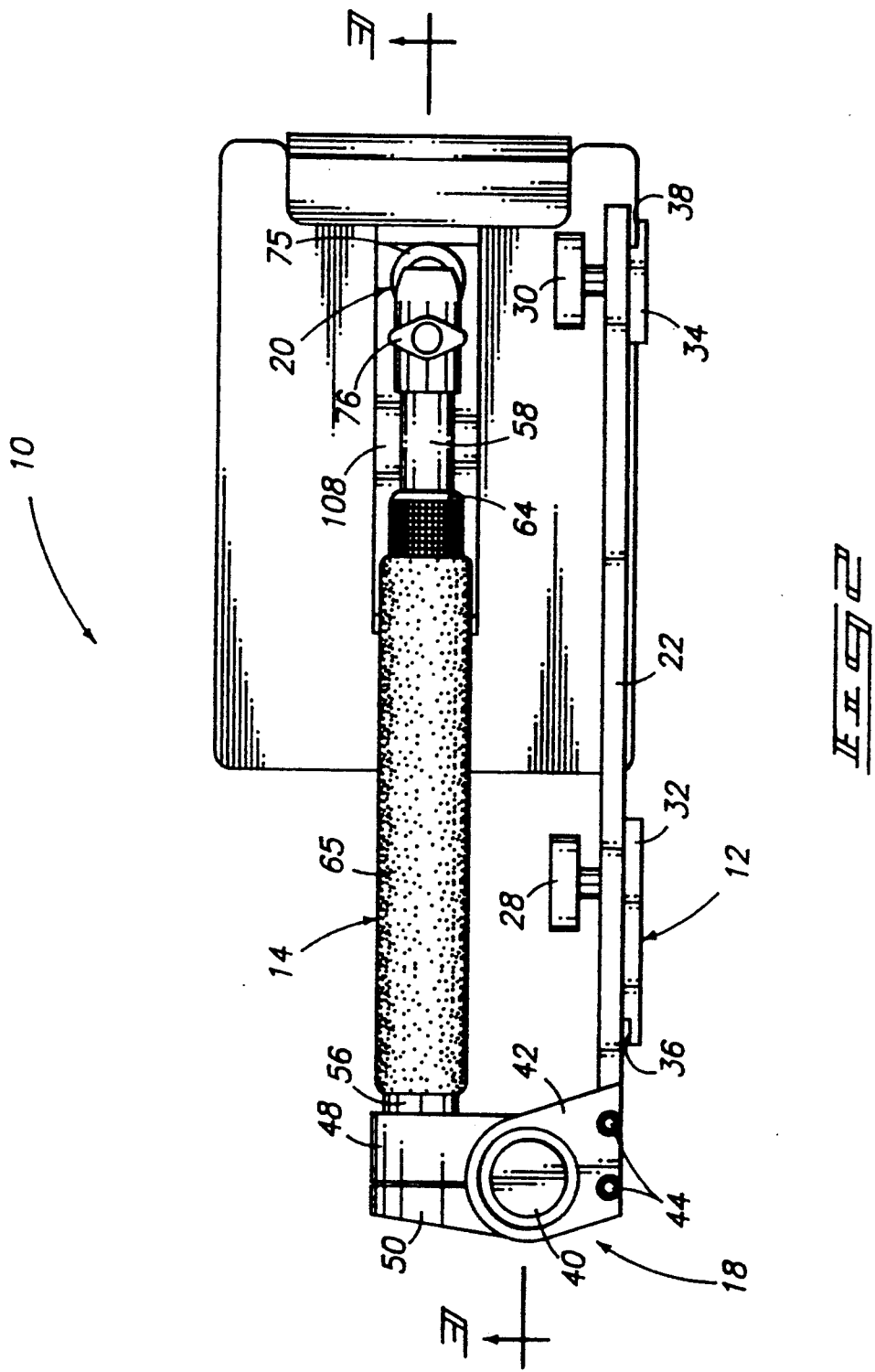

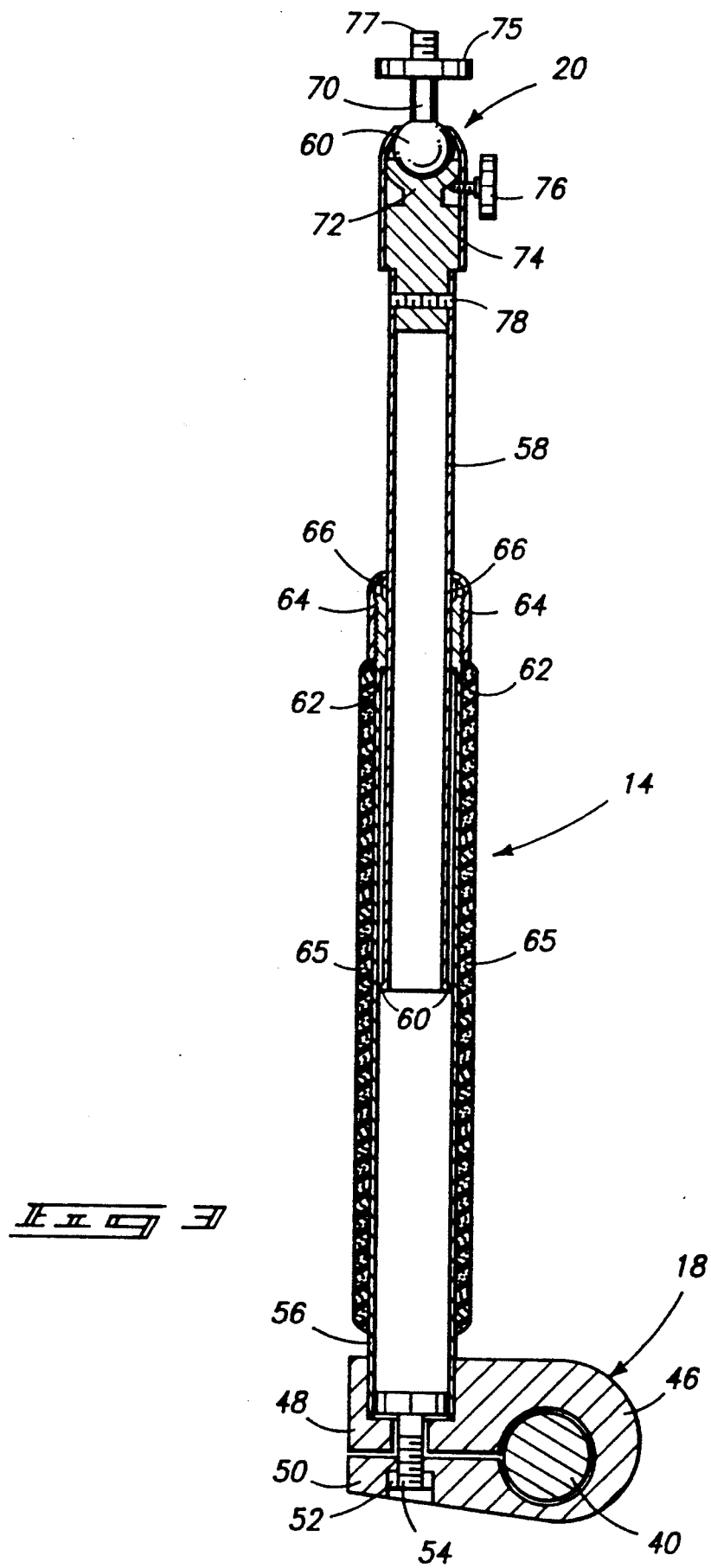

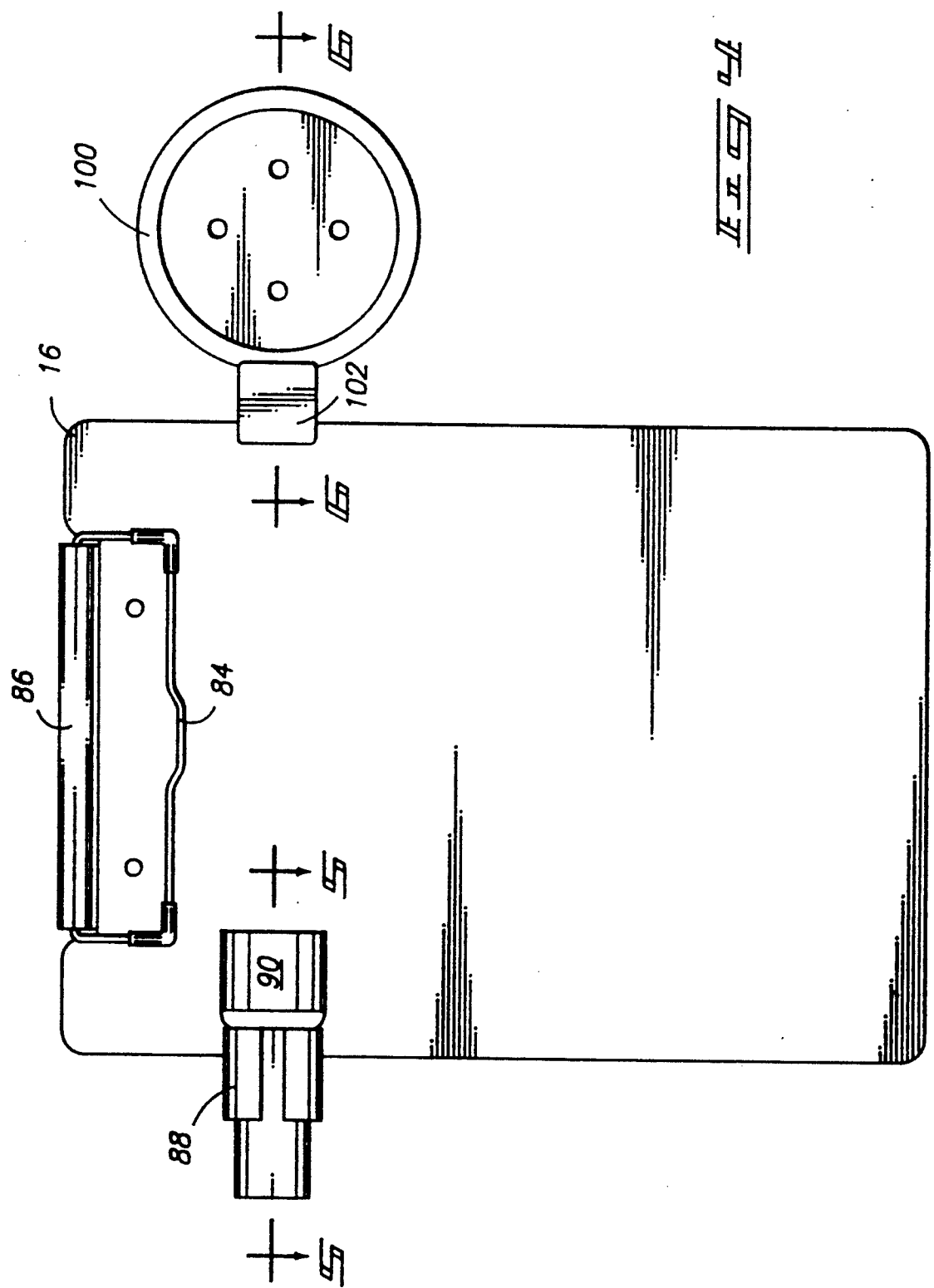

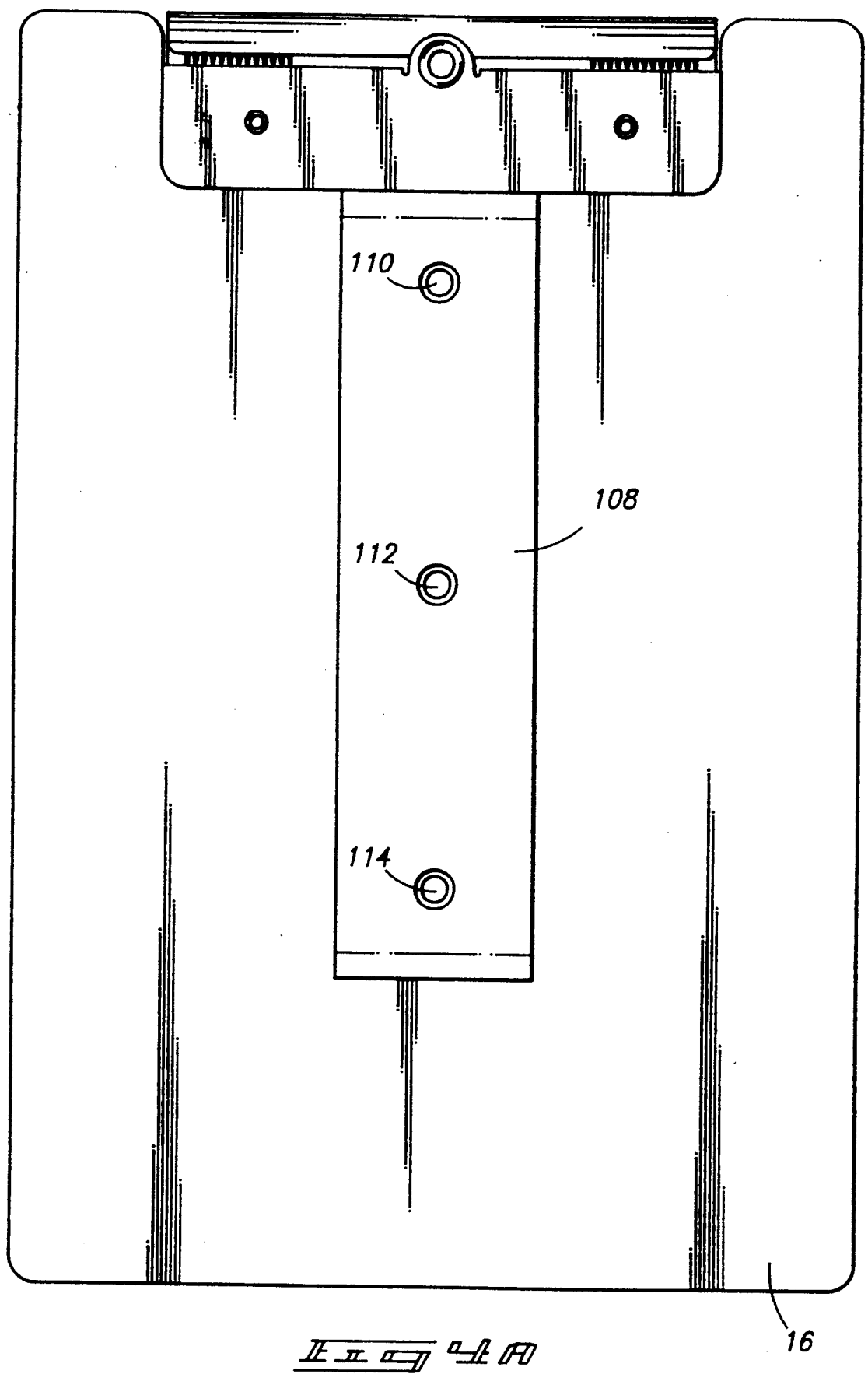

ADJUSTABLE WORKSTATION FOR VEHICLES

TECHNICAL FIELD

This invention relates to accessories for vehicles, and more particularly, to accessories for operator or passenger compartments of vehicles.

BACKGROUND OF THE INVENTION

Frequently, an operator or a passenger of a vehicle is required to perform certain work while the vehicle is being operated. For example, a driver of an automobile or a pilot of an airplane may need to review charts, maps, or notes and may need to write down information while the vehicle is in operation. Further, a vehicle operator or passenger may need to operate a computer, such as a portable lap-top computer, during operation of the vehicle. Thus, there has developed a need to provide a type of workstation for the inside of a vehicle.

Some attempts have been made to provide a workstation for passengers or operators of vehicles. In commercial airlines, for example, each passenger typically is provided a tray which folds down from a seat immediately in front of the particular passenger. In the automotive vehicle industry, most in-dash glove boxes have doors that pivot down to provide a surface for placing objects such as beverages or the like. Another known vehicle workstation involves a relatively small support structure coupled to the vehicle windshield for holding a small pad of paper for taking notes.

The above-mentioned vehicle workstations suffer from several disadvantages. Most known workstations are generally fixed in terms of mounting location on the vehicle and orientation of the working surface. Thus, these workstations fail to accommodate the variety of vehicle operators and passengers who differ greatly in terms of physical size and specific needs. Most known workstations also lack universality and must normally be specially manufactured to suit a particular type of vehicle or different models of a vehicle. Yet another problem with known vehicle workstations is that they cannot be readily installed into and removed from the vehicle. Still another problem of known workstations is that they cannot generally be collapsed into a highly compact configuration for easier portability.

Accordingly, there is a need for a vehicle workstation that can be used in a variety of vehicle types and models, that is fully adjustable in terms of location and orientation of a working surface, that is easy to install into and remove from the vehicle, and that is collapsible into a compact form to enhance portability of the workstation.

The present invention provides a workstation capable of being mounted in virtually any type and model of vehicle. The workstation of the present invention includes multiple adjustment means which allow the working surface to be positioned in almost any desired location and orientation to suit different sizes of passengers and operators and to meet a variety of working surface needs. The multiple adjustment means also allow the workstation to become completely collapsed into a compact form for improving portability. The fully adjustable vehicle workstation also advantageously includes a mounting bracket for quick installation into and removal from a variety of conventional vehicle seat frames and rails. Other objects, features, and advantages of the present invention will become apparent from the detailed disclosure which follows.

BRIEF DESCRIPTION OF THE DRAWINGS

One or more preferred forms of the invention are described herein with reference to the accompanying drawings. The drawings are briefly described below.

FIG. 1 is a rear perspective view of the vehicle workstation of the present invention.

FIG. 2 is a rear elevational view of the vehicle workstation of FIG. 1 in a collapsed, compact form for transporting.

FIG. 3 is a sectional side elevation view, taken along the line 3—3, of the vehicle workstation of FIG. 2.

FIG. 4 is a top plan view of the working surface of the vehicle workstation including auxiliary flashlight and auxiliary beverage holders mounted to the working surface of the workstation of FIG. 1.

FIG. 4A is a bottom view of the working surface of the vehicle workstation of FIG. 1.

DETAILED DESCRIPTION OF THE INVENTION

Figure 5:
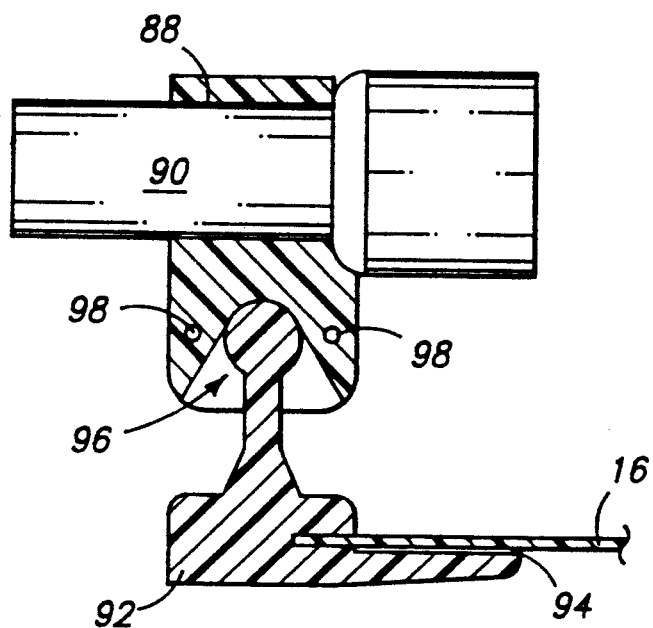
FIG. 5 is a sectional side elevation view, taken along the line 5—5 of FIG. 4, of the auxiliary flashlight holder.

This disclosure of the invention is submitted in furtherance of the constitutional purposes of the U.S. Patent Laws "to promote the progress of science and useful arts" (Article 1, Section 8).

FIGS. 1-2 show a vehicle workstation 10 adapted to be mounted to a variety of vehicle types and models. Although the present invention is particularly suitable for aircraft, it is to be understood that the present invention may also be used for a variety of other types of vehicles including automotive vehicles, aquatic vessels, and others.

The vehicle workstation 10 comprises generally a mounting bracket 12, an upstanding support arm 14, and a working surface 16. FIGS. 1 and 2 show only the rear side of the working surface 16. The top or front side of working surface 16 is shown in FIG. 4. A locking hinge 18 interconnects the mounting bracket 12 and the upstanding support arm 14. A fully articulable ball-and-socket joint 20 interconnects the working surface 16 and the upstanding support arm 14.

The mounting bracket 12 comprises a base plate 22 having a pair of elongated slots 24, 26. The mounting bracket 12 may be secured to a frame or floor of any vehicle through the slots 24, 26. In an alternative, preferred embodiment, the present invention further includes a pair of clamps 28, 30 mounted to the base plate 22 through the slots 24, 26. The clamps 28, 30 include respective clamp plates 32, 34 having respective notches 36, 38 so that the clamps 28, 30 can be positioned and secured about a pair of frame or rail members (not shown). The clamps 28, 30 ride inside the slots 36, 38 so that the mounting bracket 12 can advantageously be secured to frames or rails having a variety of widths. The notches 36, 38 are positioned under the frame or rail members; the clamps 28, 30 are then tightened to secure the frame or rail between the clamps 32, 34 and the base plate 22.

A locking hinge 18 is provided to interconnect the mounting bracket 12 and the upstanding support arm 14. With reference to FIGS. 1-3, the hinge 18 comprises a stationary shaft 40 fixedly secured to a support bracket 42 which is connected, in turn, to the base plate 22 by fasteners 44. A pinchable U-shaped hinge bracket 46 partially encircles the stationary shaft 40 to allow controlled rotation of the shaft.

As shown in FIG. 3, the hinge bracket 46 includes an upper flange 48 and a lower flange 50. A threaded nut 52 is fixedly mounted within the lower flange 50 and is adapted so threadably receive a bolt 54 integrally extending from the bottom of the upstanding support arm 14. The bolt 54 passes through an oversized aperture in flange 48 and is threaded into nut 52. Upon clockwise rotation of the support arm 14 (when viewed from the top), the upper flange 48 and lower flange 50 are forced together, which causes the hinge bracket 46 to grasp the shaft 40 to lock the hinge 18 in a desired position with the support arm 14 at a desired angle relative to the mounting bracket 12.

The upstanding support arm 14 advantageously includes an extension means which comprises a tubular base portion 56 and a tubular extension portion 58 concentrically disposed within the base portion 56. The extension portion 58 can be controllably telescopically adjusted relative to the base portion 56 to adjust the height of the workstation. A circularly annular lip 60 extends radially outwardly of the base of the tubular extension portion 58 so that upon maximum extension of the extension portion 58, the lip 60 will engage an annular abutment surface 62 of the base portion 56 to provide a positive stop to separation of the extension portion 58 from the base portion 56.

When the extension portion 58 is positioned in a preferred location relative to the base portion 56, a compression nut 64 threadably inserted over a threaded area of the base portion 56 is rotated to force an annular wedge piece 66 tightly between the base portion 56 and the extension 58 to lock the support arm 14 in a desired position.

The support arm 14 also includes a compressible foam handle portion 65 which is secured about the base portion 56 to facilitate positioning of the support arm 14 and transporting the workstation 10 when in a portable, compact form (discussed below). In addition, the foam handle portion 65 renders the base portion 56 easier to grasp and thus easier to rotate to adjust the extension position of the support arm.

Referring still to FIG. 3, the adjustability of the present invention is further enhanced by a ball-and-socket joint 20 which includes a ball portion 68 extending integrally from a stem 70 adapted to be directly coupled to the working surface 16. The socket portion 72 is fixedly secured to the extension portion 58 by means of a threaded pin 78. The ball portion 60 is held inside the joint 20 by means of a socket portion 72 over which a movable cover 74 is positioned. A clamp screw 76 is threaded through the cover 74 to engage a partially spherical exterior surface of the socket portion 72. The ball-and-socket joint 20 allows the working surface to be positioned in any number of orientations by allowing the stem 70 to be moved about an entire semi-spherical area within aperture 80 of the cover 74.

Once a desired orientation of the working surface is achieved, the clamp screw 76 is tightened which forces the cover 74 in a downward direction relative to the socket portion 72 to secure the ball portion 60 in the desired orientation. As shown in FIG. 1, the cover 74 advantageously includes a narrowed slot 82 for receiving the stem 70 so that the working surface 16 can be rotated into a compact position parallel to the support arm 14 for transportation and storage (FIG. 2).

With reference to FIG. 4, the invention further includes a working surface 16 which is generally planar, similar to a conventional clipboard. The working surface 16 includes a clip 84 hingedly coupled to the working surface 16 within housing 86 which includes a bias member (not shown) which forces and maintains the clip 84 tightly against the planar surface 16. The clip 84 is adapted to hold work or reference materials against the working surface 16. The planar working surface 16 may also include printed indicia (not shown) to provide the vehicle operator or passenger with useful, pertinent information to assist in the operation of the vehicle. The above described hinge 18, telescoping support arm 14, and the ball-and-socket joint 20 provide a combined adjustment means which allows the working surface 16 to be positioned in almost and suitable location and orientation.

FIG. 4A shows the bottom side of the working surface 16, which includes a positioning plate 108 flushly mounted to the working surface 16. The plate 108 is preferably secured to the working surface using a double-sided foam tape, although other conventional adhesives could alternatively be used. The positioning plate 108 includes multiple threaded mounting holes 110, 112, 114, any of which may receive a connecting bolt 77 extending from the connecting member 75 (FIG. 3) of the support arm 14. The multiple mounting holes allow the working surface to be positioned at a variety of locations relative to the support arm. Mounting hole 110 allows the working surface 16 to be positioned farther away from the firewall of the vehicle. Mounting hole 114 allows the working surface 16 to be positioned closer to the vehicle firewall. Mounting hole 112 allows the working surface 16 to be centrally mounted on the support arm 14 to provide equal weight distribution for supporting a heavy piece of equipment, such as a laptop computer.

With reference to FIGS. 4 and 5, an auxiliary flashlight holder 88 is shown which is adapted to hold a flashlight 90 to improve visibility of the working materials on the working surface 16. As shown in FIG. 5, the flashlight holder 88 advantageously includes a specialized mounting bracket 92 which is adapted to be inserted over the planer working surface 16. Although the embodiment of FIG. 4 shows the auxiliary flashlight holder 88 secured to the upper left-hand side of the working surface 16, it is to be understood that the flashlight holder 88 could be mounted at any desired location on the working surface 16. In one embodiment, the bracket 94 may be held in place on the stationary surface by a conventional adhesive or double-sided foam tape 94.

The flashlight 90 is oriented on the mounting bracket 92 by pivoting the holder 88 relative to the mounting bracket 92 by means of a ball-and-socket joint 96. Once the flashlight holder 88 has been oriented in a desired position, transverse clamping screws within transverse mounting locations 98 are rotatably tightened to secure the holder 88 is the desired position.

Figure 6:
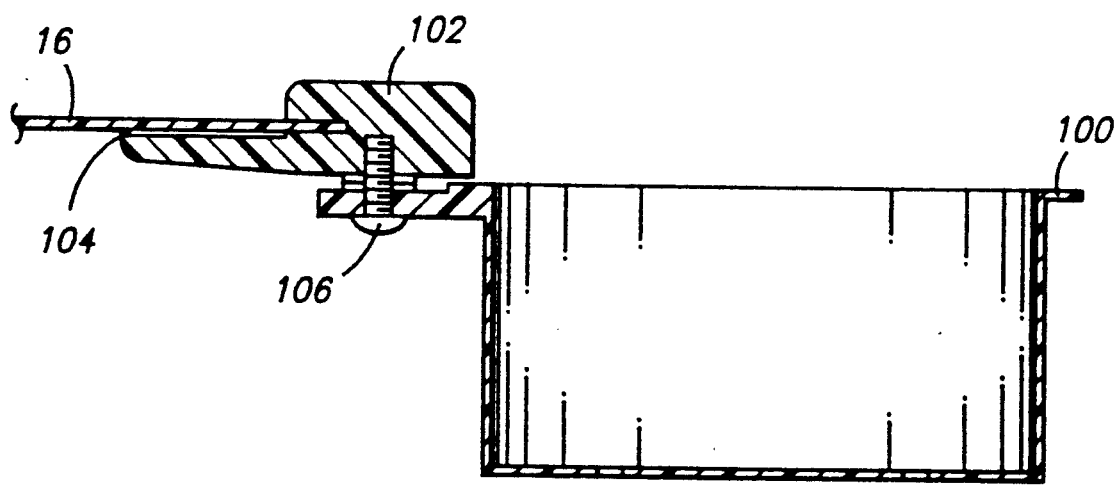
FIG. 6 is a sectional side elevation view, taken along the line 6—6 of FIG. 4, of the auxiliary beverage holder.

With reference to FIGS. 4 and 6, a beverage holder 100 may also alternatively be coupled to the planar working surface 16 to provide a location for receiving a typical beverage container (not shown). The beverage holder 100 is also provided with a specialized mounting bracket 102 adapted to be inserted over an edge of the planar working surface 16. Although the embodiment of FIG. 4 shows the auxiliary beverage holder 100 secured to the upper right-hand side of the working surface 16, it is to be understood that the beverage holder 100 could be mounted at any desired location on the working surface 16.

The bracket 102 can be secured in position by use of a conventional adhesive or double-sided foam tape 104 between the mounting bracket 102 and the planar working surface 16. The beverage holder 100 is positioned relative to the mounting bracket 102 by pivoting the cup about a mounting screw 106. Upon locating the holder 100 in a desired position, the mounting screw 106 is tightened to hold the cup in the desired location.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

I claim:

1. An adjustable workstation for vehicles, comprising:
   mounting means for connecting an adjustable workstation to a vehicle, the mounting means allowing the workstation to be readily installed into and removed from an operator's compartment of the vehicle;
   an upstanding support arm including a rotatable base portion, the support arm being pivotally connected to the mounting means, the support arm including an extension means for adjusting the length of the support arm;
   hinge means interconnecting the mounting means and the upstanding support arm for allowing controllable articulation of the support arm relative to the mounting means the hinge means being locked in a desired position by rotation of the base portion;
   a planar working surface coupled to the upstanding support arm;
   pivot means coupled between the working surface and the support arm for controllably positioning the working surface at a desired orientation;
   wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle.

2. The workstation of claim 1 wherein the extension means comprises:
   a tubular base portion;
   a tubular extension portion slidably disposed inside the base portion; and
   a lock nut for securing the extension portion in a desired position relative to the base portion according to a preferred length of the support arm.

3. The adjustable workstation according to claim 1 further comprising:
   a foam handle secured the periphery of the rotatable base portion of the upstanding support arm to facilitate grasping and rotating the rotatable base portion.

4. The workstation of claim 1 wherein the pivot means comprises:
   a ball portion extending generally downward from the working surface;
   a stem portion extending from the ball portion;
   a socket portion extending generally upward from the upstanding support member for receiving and supporting the ball portion, the ball portion being movable within the socket portion across an entire semi-spherical area;
   a movable cover piece positioned over the ball portion and the socket portion to hold the ball portion in engagement with the socket portion, the movable cover piece including a narrowed slot for receiving the stem portion when the workstation is in a collapsed, transportable condition; and
   means for locking the ball portion in place relative to the socket portion to secure the planar working surface in a desired orientation.

5. The workstation of claim 1 wherein the pivot means comprises:
   a ball portion extending generally downward from the working surface;
   a socket portion extending generally upward from the upstanding support member for receiving and supporting the ball portion, the ball being movable within the socket portion across an entire semi-spherical area;
   a movable cover positioned over the ball portion and the socket portion to hold the ball portion in engagement with the socket portion; and
   a clamp screw threadably passing through the movable cover and engaging the socket portion to force the movable cover in a downward direction to maintain the ball portion tightly against the socket portion and lock the ball portion in place relative to the socket portion to secure the planar working surface in a desired orientation.

6. The adjustable workstation of claim 1, further comprising a beverage container holder mounted to the planar working surface, the beverage container holder adapted to hold a beverage container to prevent the container from shifting during operation of the vehicle, the beverage container holder being inserted over an edge of the planar working surface and being secured in place by an adhesive.

7. The adjustable workstation of claim 1 further comprising a clip secured to a top end of the planar working surface for securing work or reference materials on top of the planar working surface.

8. The adjustable workstation of claim 1, further comprising:
   a flashlight holder mounted to the planar working surface, the flashlight holder being adapted to securably hold a flashlight to facilitate viewing of materials on the working surface during nighttime operation of the vehicle, the flashlight holder being inserted over an edge of the planar working surface and being held in place by an adhesive.

9. An adjustable workstation for vehicles, comprising:
   mounting means for connecting an adjustable workstation to a vehicle, the mounting means allowing the workstation to be readily installed into and removed from an operator's compartment of the vehicle;

an upstanding support arm pivotally connected to the mounting means, the support arm including an extension means for adjusting the length of the support arm;

hinge means interconnecting the mounting means and the upstanding support arm for allowing controllable articulation of the support arm relative to the mounting means;

a planar working surface coupled to the upstanding support arm;

pivot means coupled between the working surface and the support arm for controllably positioning the working surface at a desired orientation;

wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle;

wherein the hinge means comprises:

a stationary shaft fixedly secured to the mounting means;

a hinge bracket at least partially encircling the shaft and being rotatable about the shaft;

first and second flanges extending from the hinge bracket; and a clamp bolt for forcing the first and second flanges toward each other to cause the hinge bracket to tightly grasp the shaft to lock the support arm in a desired articulated position.

10. An adjustable workstation for vehicles, comprising:

mounting means for connecting an adjustable workstation to a vehicle, the mounting means allowing the workstation to be readily installed into and removed from an operator's compartment of the vehicle;

an upstanding support arm pivotally connected to the mounting means, the support arm including an extension means for adjusting the length of the support arm;

hinge means interconnecting the mounting means and the upstanding support arm for allowing controllable articulation of the support arm relative to the mounting means;

a planar working surface coupled to the upstanding support arm;

pivot means coupled between the working surface and the support arm for controllably positioning the working surface at a desired orientation;

wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle; and further comprising a cover including a slot wherein a stem piece interconnecting the ball portion with the working surface can be positioned when the workstation is collapsed into the compact form for transporting.

11. An adjustable workstation for vehicles, comprising:

mounting means for connecting an adjustable workstation to a vehicle, the mounting means allowing the workstation to be readily installed into and removed from an operator's compartment of the vehicle;

an upstanding support arm pivotally connected to the mounting means, the support arm including an extension means for adjusting the length of the support arm;

hinge means interconnecting the mounting means and the upstanding support arm for allowing controllable articulation of the support arm relative to the mounting means;

a planar working surface coupled to the upstanding support arm;

pivot means coupled between the working surface and the support arm for controllably positioning the working surface at a desired orientation;

wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle; and wherein the mounting means comprises a mounting bracket including a base plate having a pair of elongated slots and opposite clamps which ride in the slots, the clamps being movable relative to one another to vary the distance between the clamps so that the mounting bracket can be connected to a variety of seat frames or seat rails.

12. An adjustable workstation for vehicles, comprising:

mounting means for connecting an adjustable workstation to a vehicle, the mounting means allowing the workstation to be readily installed into and removed from an operator's compartment of the vehicle;

an upstanding support arm pivotally connected to the mounting means, the support arm including an extension means for adjusting the length of the support arm;

hinge means interconnecting the mounting means and the upstanding support arm for allowing controllable articulation of the support arm relative to the mounting means;

a planar working surface coupled to the upstanding support arm;

pivot means coupled between the working surface and the support arm for controllably positioning the working surface at a desired orientation;

wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle; and further comprising a positioning plate secured to an underside of the working surface, the positioning plate including a plurality of mounting holes to allow the working surface to be mounted at various positions on the support arm.

13. A fully adjustable, portable workstation for vehicles, comprising:

mounting means for connecting an adjustable workstation to a vehicle, the mounting means allowing the workstation to be readily installed into and removed from an operator's compartment of the vehicle;

an upstanding support arm pivotally connected to the mounting means, the support arm including an extension means for adjusting the length of the support arm, the extension means comprising:
a tubular base portion;
a tubular extension portion slidably disposed inside the base portion; and
a lock nut for securing the extension portion in a desired position relative to the base portion according to a preferred length of the support arm;

hinge means interconnecting the mounting means and the upstanding support arm for allowing controllable articulation of the support arm relative to the mounting means, the hinge means comprising:
a stationary shaft fixedly secured to the mounting means;
a hinge bracket at least partially encircling the shaft and being rotatable about the shaft;
first and second flanges extending from the hinge bracket; and
a bolt interconnecting the first and second flanges for forcing the first and second flanges toward each other to cause the hinge bracket to tightly grasp the shaft and lock the support arm in a desired articulated position; a planar working surface coupled to the upstanding support arm;

pivot means coupled between the working surface and the support arm for controllably positioning the working surface at a desired orientation, the pivot means comprising:
a ball portion extending generally downward from the working surface;
a socket portion extending generally upward from the upstanding support arm for receiving and supporting the ball portion, the ball portion being movable within the socket portion across an entire semi-spherical area;
a movable cover positioned over the ball portion and the socket portion to hold the ball portion in engagement with the socket portion; and
means for locking the ball portion in place relative to the socket portion to secure the planar working surface in a desired orientation;

wherein the hinge means, the pivot means, and the mounting means form a combined overall adjustment means for allowing the workstation to be fully adjustable to position the working surface at a desired location and orientation and for allowing the workstation to be readily installed or removed from the vehicle and folded into a compact form for transporting to and from the vehicle.

14. The adjustable workstation of claim 13, further comprising:
a flashlight holder mounted to the planar working surface, the flashlight holder adapted to securably hold a flashlight to facilitate viewing of materials on the working surface during nighttime operation of the vehicle, the flashlight holder being inserted over an edge of the planar working surface and being held in place by an adhesive or double-sided foam tape.

15. The adjustable workstation of claim 13, further comprising a beverage container holder mounted to the planar working surface, the beverage container holder adapted to hold a beverage container to prevent the container from shifting during operation of the vehicle, the beverage container holder being inserted over an edge of the planar working surface and being secured in place by an adhesive or double-sided foam tape.

16. The adjustable workstation according to claim 13 further comprising:
a foam handle positioned about the periphery of the base portion of the upstanding support arm to facilitate positioning the support arm and adjusting the extension means.

17. The workstation of claim 13 further comprising a positioning plate secured to an underside of the working surface, the positioning plate including a plurality of mounting holes to allow the working surface to be mounted at various positions on the support arm.

* * * * *